UNITED STATES PATENT OFFICE.

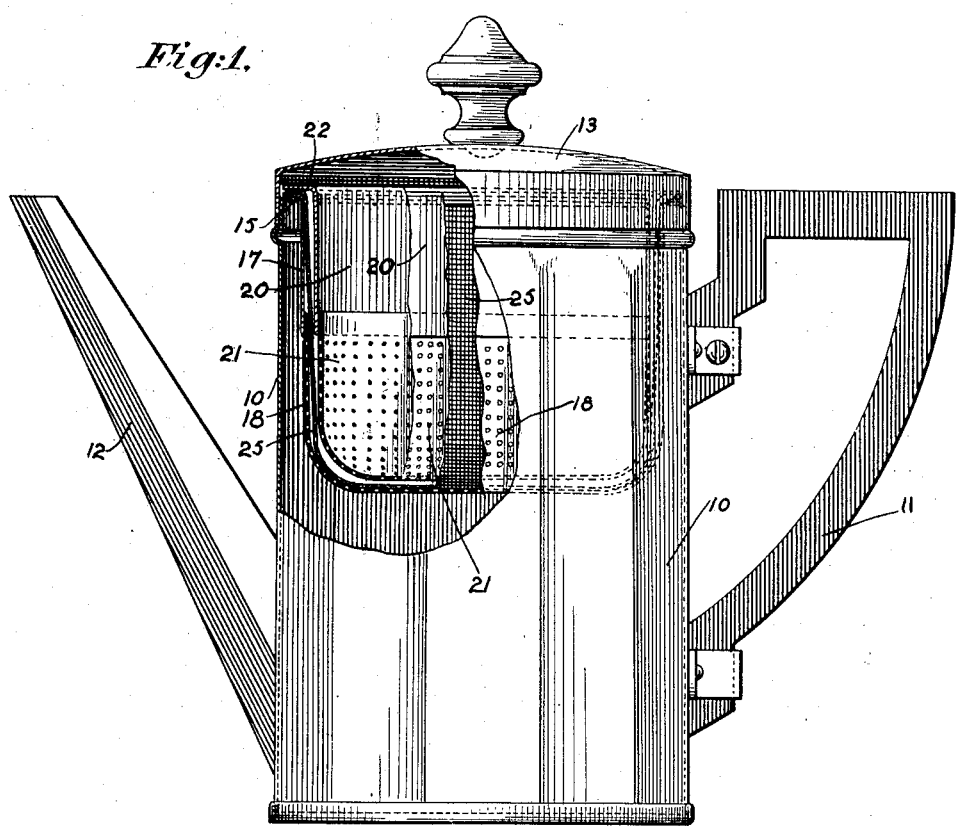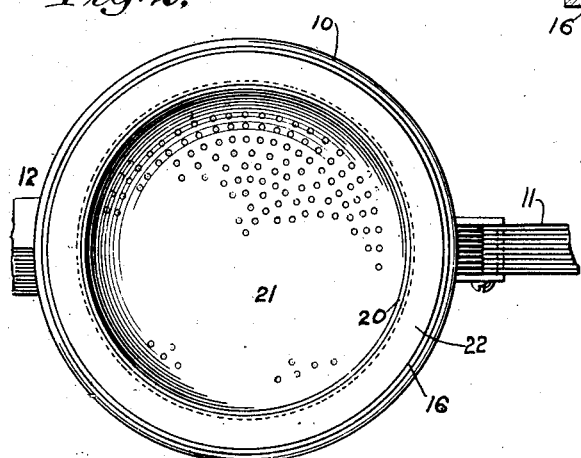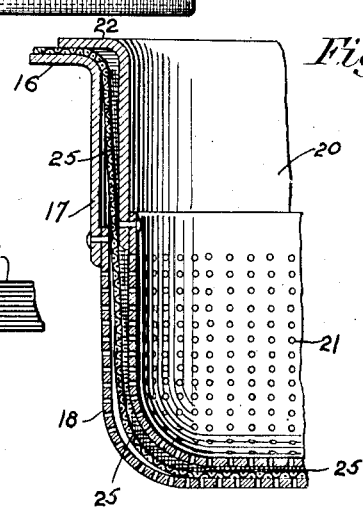

JOSEPH HEINRICHS, OF NEW YORK, N. Y.

COFFEE OR TEA POT.

1,357,051.  Specification of Letters Patent.  Patented Oct. 26, 1920.

Application filed March 21, 1919. Serial No. 284,001.

*To all whom it may concern:*

Be it known that I, JOSEPH HEINRICHS, a citizen of the United States, and a resident of the city of New York, borough of Manhattan, in the county and State of New York, have invented a new and Improved Coffee or Tea Pot, of which the following is a full, clear, and exact description.

The object of the invention is to provide a new and improved coffee or tea pot arranged to insure an effective percolation of the boiling water through the coffee grounds or tea leaves and without danger of particles of the coffee grounds or tea leaves passing through the filtrate into the pot. Another object is to permit the use of a cheap filtering medium, such as filtering paper or the like, which can be readily thrown away after being used once. Another object is to permit of readily assembling the parts for cleaning and other purposes to maintain the parts at all times in sanitary condition.

With these and other objects in view, the invention consists of certain novel features of construction, as hereinafter shown and described and then specifically pointed out in the claim.

A practical embodiment of the invention is represented in the accompanying drawings forming a part of this specification, in which similar characters of reference indicate corresponding parts in all the views.

Figure 1 is a side elevation of the coffee or tea pot with parts shown in section;

Fig. 2 is a plan view of the same with the cover removed; and

Fig. 3 is an enlarged sectional side elevation of the cups with a filtering medium between them.

The body 10 of the coffee or tea pot is provided with a suitable handle 11 and a spout 12, and the upper open end of the pot 10 is adapted to be closed by a suitable cover 13. The body 10 is provided at its upper end with an inwardly extending annular flange 15 on which is adapted to rest an outwardly extending annular flange 16 formed on the upper end of a cup 17, the lower portion 18 of which is perforated. Within this cup 17 extends a second cup 20 having its lower portion 21 perforated and having its upper end provided with an outwardly extending annular flange 22 for supporting the cup 20 from the flange 16 of the outer cup 17. The cup 20 is somewhat less in diameter than the cup 17 to provide sufficient space between the two cups for a filtering medium 25, preferably in the form of filtering paper, cheesecloth or the like, and which may be extended between the flanges 16 and 22, as indicated in Fig. 3. The coffee grounds or tea leaves are placed in the inner cup 20 and then this cup is filled with hot water which percolates through the coffee grounds or tea leaves and through the perforations of the lower portion 21 of the cup to then filter through the filtering medium 25 and to then pass through the perforations of the lower portion 18 of the outer cup 17. The filtrate leaving the outer cup 17 passes into the pot 10 in a perfectly clear condition owing to the action of the perforated portions 21 and 18 of the cups 20 and 17 and the filtering medium 25 interposed between the said cups.

By providing the cups 17 and 20 with perforated lower portions only a quick filtration is prevented as the water filling the inner cup 20 can only gradually pass through the perforations in the lower portion 21, and a like action is had in the perforated lower portions 18 of the outer cup 17. In practice it takes about two and a half minutes for the water to percolate through the ordinary ground coffee, but for powdered coffee a longer time is required.

It will be noticed that by the arrangement described the percolate that passes into the pot 10 is perfectly clear and free of particles from the coffee grounds or the tea leaves.

It is understood that the filtering medium 25 on account of being made of paper or other cheap material can be readily thrown away after being used once.

Having thus described my invention I claim as new and desire to secure by Letters Patent:—

In combination with a coffee or tea pot having an inwardly extending flange at its upper end, cups having their base and lower portion perforated, one extending within the other with a space between the cups and each having an outwardly extending flange at its upper end, the flange of the outer cup being seated on the said pot flange and the flange of the inner cup being seated on the flange of the outer cup, and a filtering medium of flexible material interposed between the said cups and having its upper edge secured between the outwardly extending flanges of the cups.

JOSEPH HEINRICHS.